UNITED STATES PATENT OFFICE.

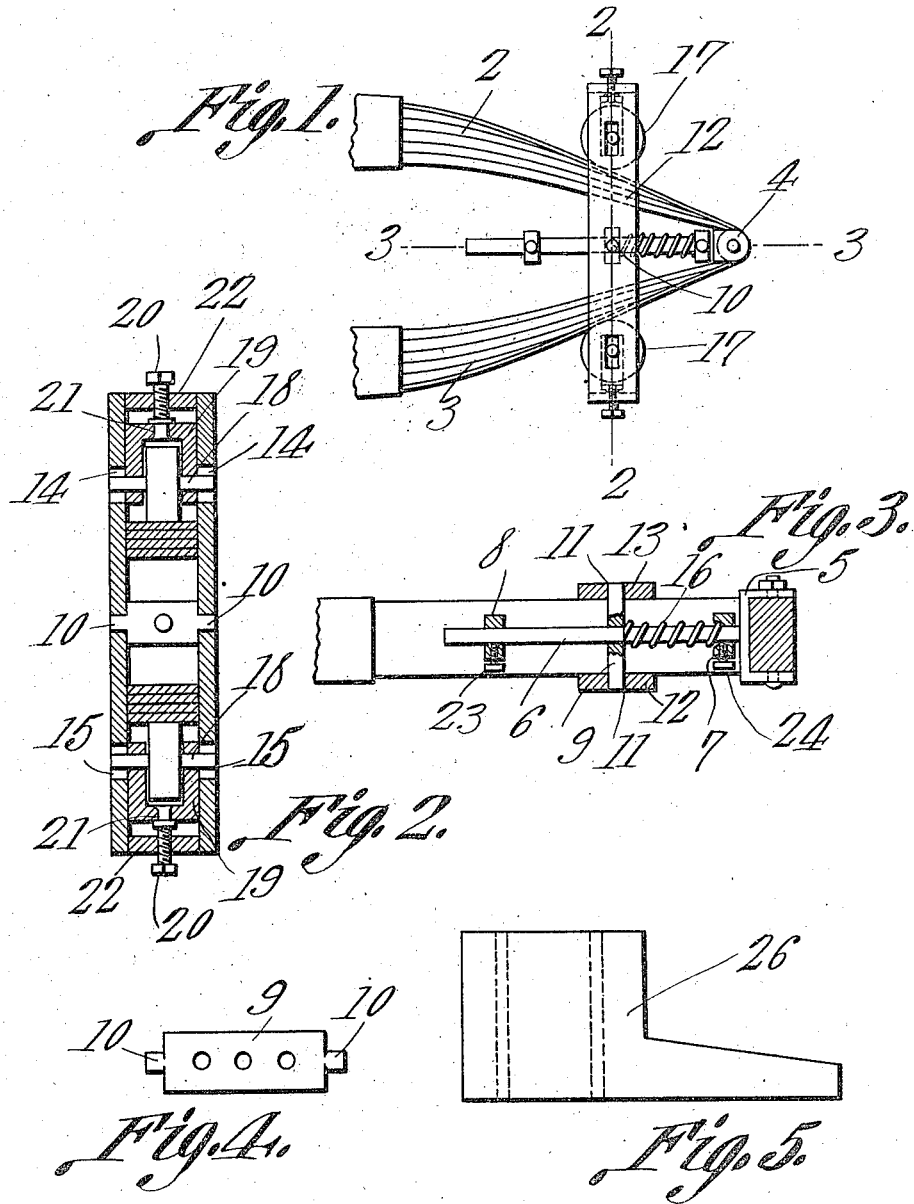

FRANK A. LYNCH, OF ROANOKE, VIRGINIA.

SHOCK-ABSORBER.

987,731. Specification of Letters Patent. Patented Mar. 28, 1911.

Application filed November 9, 1910. Serial No. 591,498.

*To all whom it may concern:*

Be it known that I, FRANK A. LYNCH, a citizen of the United States, residing at Roanoke, in the county of Roanoke and State of Virginia, have invented a new and useful Shock-Absorber, of which the following is a specification.

This invention relates to shock absorbers for use in connection with elliptical or semi-elliptical springs for vehicles, one of the objects of the invention being to provide a simple form of device of this character which can be readily applied to ordinary forms of springs of the type mentioned and which device acts directly upon the springs so as to retard their movement back to their normal positions after having been subjected to excessive stress such as produced, for example, while the vehicle carrying them is jolted over rough surfaces, obstructions and the like.

A further object is to provide a shock absorber of this character which, while acting directly upon the springs, will not injure them.

A further object is to provide a device of this character which is compact in construction and can be used upon the springs without necessitating any change in the structure of the vehicle.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings,—Figure 1 is a side elevation of one end portion of an elliptical spring and showing the shock absorber in position thereon. Fig. 2 is an enlarged section on line 2—2 Fig. 1. Fig. 3 is an enlarged section on line 3—3 Fig. 1. Fig. 4 is a detail view of a guide used in connection with the shock absorber. Fig. 5 is an elevation of a block for use in connection with a semi-elliptical spring where the shock absorber is employed.

Referring to the figures by characters of reference 2 and 3 designate the upper and lower laminated members of an elliptical vehicle spring, said members being connected at their ends by coupling bolts 4. In the drawings only one end portion of the spring has been illustrated. Bolts 4 extend through and constitute the pivot of a yoke 5 formed at one end of a stem 6, said stem carrying collars 7 and 8 which are adjustably mounted thereon, there being any suitable means, such as set screws 23 and 24, for holding these collars against movement relative to the stem. Said stem is slidably mounted within a guide plate 9 provided with trunnions 10 which are journaled within the side plates of the body portion of the shock absorber. These side plates which have been indicated at 12 and 13, are provided with openings 11 for the reception of the trunnions and the ends of the side plates are connected by means of heads 22 integral with the plates or secured to them in any manner preferred. Longitudinal slots 14 and 15 are formed in the upper and lower end portions, respectively, of the plates 12 and 13, these slots receiving trunnions 18 extending from bearing rollers 17. These rollers are mounted within slidable blocks 19, the trunnions 18 bearing within the blocks. Adjusting screws 20 are swiveled within the blocks and have screw-threaded portions engaging the heads 22. Obviously, by means of these screws, the blocks 19 can be shifted longitudinally between the side plates of the body of the shock absorber so as to bring the rollers 17 nearer together or farther apart as desired. It is to be understood of course that the upper and lower portions 2 and 3, respectively, of the spring project between the plates 12 and 13 and also between the rollers 17, one of these rollers bearing downwardly upon the upper portion 2 of the spring, while the other roller bears upwardly upon the lower portion 3.

The guide plate 9 projects between the two portions of the spring and a spring 16, which is mounted on stem 6, bears at its ends against collar 7 and the plate 9 so as to force said plate and the body portion of the absorber, constantly in the direction of the centers of the spring members 2 and 3. As the spring 16 forces the rollers 17 against the members of the vehicle spring, it will be apparent that these rollers will be promptly shifted toward the center of the spring as soon as the two members 2 and 3 are moved together from any cause, as by the sudden application of weight to the vehicle or the jolting of the vehicle. The quick return of the members of the spring to their initial positions will thus be prevented and, instead, said spring members can only return by first forcing the rollers 17 toward the pivot bolt 4. In other words the spring members 2 and 3, as they return to their initial positions, act as a wedge or spreading means and cause the absorber to move toward the bolt 4 and against the stress of the spring 16. Obviously the time required for this return movement of the parts will be dependent upon the strength of the spring 16 and the spring members 2 and 3. In any event, however, the reaction of the spring members 2 and 3 will be considerably retarded and shocks such as produced when a vehicle is traveling over a rough surface, will be practically completely absorbed.

Although only one absorber has been shown upon the vehicle spring, it is to be understood that, if desired, one of these absorbers can be located at each end of the spring.

Should a semi-elliptical spring be employed in connection with the absorber, it is desirable to use an attaching block such as illustrated in Fig. 5, this block, which has been designated at 26, being provided with an extension having an inclined face which coöperates with the inclined portion of the spring attached to the block, for properly guiding the absorber during the movement of the spring out of normal position.

In Fig. 4 the plate 9 has been shown provided with a series of apertures, these apertures being employed where more than one stem 6 is utilized.

What is claimed is:—

1. A shock absorber including a guide element, means for attaching the same to one end portion of a spring, a body slidably connected to said element and adapted to extend around a spring, opposed rollers mounted within said body for engagement with the spring, and resilient means upon said element for holding the body normally in a predetermined position relative to the element.

2. A shock absorber including a guide element, means at one end thereof for engaging a vehicle spring, an absorber body slidable relative to said element, spring-engaging rollers mounted within said body, and elastic means carried by said element for holding the body normally spaced from said attaching means.

3. A shock absorber including a guide stem, means at one end thereof for engaging a spring, an absorber body engaging and slidable relative to the stem, opposed rollers adjustably mounted within the body for engaging a spring embraced by the body, and means upon the stem for holding the body normally pressed yieldingly from said spring engaging means upon the stem.

4. The combination with a spring, of a stem, means for pivotally connecting the stem with the spring, a structure slidably mounted on the stem, rollers journaled within said structure and bearing upon opposite portions of the spring, and a spring upon the stem and engaging said structure for holding the rollers normally in engagement with the spring.

5. The combination with a spring, of a shock absorber including a guide stem pivotally connected to the spring, a guide element slidably mounted on the stem, a frame in which said element is journaled, opposed anti-friction devices within said structure, means for adjusting said devices toward or away from each other, and a spring upon the stem engaging said element for holding the antifriction devices normally pressed into engagement with the spring.

6. The combination with a spring, of a shock absorber including a structure embracing and movably mounted on the spring, means for automatically shifting said structure bodily relative to and in the direction of the length of the spring when said spring is placed under stress and for retarding the return movement of the structure during the rebound of the spring.

In testimony that I claim the foregoing as my own, I have hereto affixed my signature in the presence of two witnesses.

FRANK A. LYNCH.

Witnesses:
J. B. HENRITTER,
J. E. RUGGLES.

Copies of this patent may be obtained for five cents each, by addressing the "Commissioner of Patents, Washington, D. C."